US012789370B2

(12) United States Patent
Ouchi et al.

(10) Patent No.: US 12,789,370 B2
(45) Date of Patent: Nov. 10, 2026

(54) ROBOT, ROBOT SYSTEM, AND ROBOT OPERATION METHOD

(71) Applicant: KAWASAKI JUKOGYO KABUSHIKI KAISHA, Kobe (JP)

(72) Inventors: Satoshi Ouchi, Kobe (JP); Yusuke Fujimoto, Kobe (JP); Keita Sasaki, Kobe (JP); Akio Yoda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 12 days.

(21) Appl. No.: 18/879,858

(22) PCT Filed: Jun. 21, 2023

(86) PCT No.: PCT/JP2023/023021

§ 371 (c)(1),
(2) Date: Dec. 30, 2024

(87) PCT Pub. No.: WO2024/004796

PCT Pub. Date: Jan. 4, 2024

(65) Prior Publication Data

US 2026/0001220 A1 Jan. 1, 2026

(30) Foreign Application Priority Data

Jun. 30, 2022 (JP) ................................ 2022-106158

(51) Int. Cl.
*B25J 9/16* (2006.01)
*B25J 13/08* (2006.01)

(52) U.S. Cl.
CPC ........... *B25J 9/1633* (2013.01); *B25J 13/082* (2013.01)

(58) Field of Classification Search
CPC ...... B25J 9/1633; B25J 13/082; B25J 13/085; G05B 2219/39322; G05B 2219/39529; G05B 2219/40626
(Continued)

(56) References Cited

U.S. PATENT DOCUMENTS 5,754,433 A * 5/1998 Fukui ...................... G06F 3/011 318/566
7,541,764 B2 * 6/2009 Takenaka ............... B25J 13/085 318/568.2
(Continued)

FOREIGN PATENT DOCUMENTS

DE 10 2015 009 872 B4 11/2018
DE 10 2014 108 287 B4 8/2019
(Continued)

OTHER PUBLICATIONS

Aug. 8, 2023 International Search Report issued in International Patent Application No. PCT/JP2023/023021.
(Continued)

*Primary Examiner* — Jaime Figueroa
(74) *Attorney, Agent, or Firm* — Oliff PLC

(57) ABSTRACT

A robot includes: a robot hand attached to a distal end portion of a robot arm; and a control unit configured to control each operation of the robot arm and the robot hand to perform a work on an object. The robot hand includes a force sensor, and the control unit controls the operation of the robot arm such that the force sensor detects position information and posture information on the object by pressing a part of the robot hand against the object.

4 Claims, 10 Drawing Sheets

(58) Field of Classification Search
USPC ................. 700/245–264; 318/568.11–568.25
See application file for complete search history.

(56) References Cited

U.S. PATENT DOCUMENTS

| | | | | |
|---|---|---|---|---|
| 9,656,388 | B2 * | 5/2017 | Nammoto | B25J 9/1697 |
| 10,166,676 | B1 * | 1/2019 | Hudson | B25J 9/1612 |
| 10,201,901 | B2 * | 2/2019 | Sato | B25J 9/1674 |
| 12,186,904 | B2 * | 1/2025 | Ahn | B25J 9/1664 |
| 12,384,030 | B2 * | 8/2025 | SøE-Knudsen | B25J 9/1666 |
| 2007/0013506 | A1 * | 1/2007 | Takenaka | B25J 13/085 340/500 |
| 2012/0004774 | A1 * | 1/2012 | Umetsu | B25J 9/1697 700/254 |
| 2012/0053724 | A1 * | 3/2012 | Okamoto | B25J 9/1697 700/114 |
| 2012/0197438 | A1 * | 8/2012 | Ogami | B25J 9/1682 901/46 |
| 2015/0120058 | A1 * | 4/2015 | Karito | B25J 9/1612 901/9 |
| 2015/0336268 | A1 | 11/2015 | Payton et al. | |
| 2016/0039092 | A1 | 2/2016 | Harada et al. | |
| 2016/0055425 | A1 * | 2/2016 | Minami | G05B 19/425 706/12 |
| 2016/0221193 | A1 * | 8/2016 | Sato | B25J 13/085 |
| 2019/0022859 | A1 * | 1/2019 | Ogawara | B25J 9/1635 |
| 2021/0039264 | A1 | 2/2021 | Ishizuka et al. | |
| 2021/0138662 | A1 * | 5/2021 | Tsukui | B25J 15/0023 |
| 2021/0371212 | A1 | 12/2021 | Park et al. | |
| 2022/0032411 | A1 | 2/2022 | Lombard et al. | |
| 2022/0176556 | A1 * | 6/2022 | Ahn | B25J 19/02 |

FOREIGN PATENT DOCUMENTS

| | | | |
|---|---|---|---|
| JP | H09-258814 | A | 10/1997 |
| JP | H10-089943 | A | 4/1998 |
| JP | 2002-103156 | A | 4/2002 |
| JP | 2012-011531 | A | 1/2012 |

OTHER PUBLICATIONS

Aug. 8, 2023 Written Opinion issued in International Patent Application No. PCT/JP2023/023021.

* cited by examiner

ROBOT, ROBOT SYSTEM, AND ROBOT OPERATION METHOD

CROSS-REFERENCE TO RELATED APPLICATIONS

This application is based on and claims priority from Japanese Patent Application No. 2022-106158 filed on Jun. 30, 2022, and the entire contents of which are incorporated herein by reference.

TECHNICAL FIELD

The present disclosure relates to a robot, a robot system, a robot operation method, and a technique capable of automating various works such as a component replacement work and an assembly work.

BACKGROUND ART

Various techniques of performing various works by using a robot have been proposed (for example, see Patent Literature 1). In Patent Literature 1, as shown in FIG. 1 thereof, a gripping portion 7 for detachably gripping a polishing disc 3 is provided at a distal end of a robot arm 6. The polishing disc 3 is mounted to a turntable 2. A moving unit 11 is provided between the robot arm 6 and the gripping portion 7 to move the gripping portion 7 in X and Y directions with respect to the robot arm 6.

Inner side surfaces 24a of a V-shaped guide 24 of the moving unit 11 abut against an outer peripheral side surface 2a of the turntable 2 to sandwich the outer peripheral side surface 2a. Accordingly, the centers of the polishing disc 3 and the turntable 2 coincide with each other, and the alignment of the polishing disc 3 in the X and Y directions is completed.

CITATION LIST

Patent Literature

Patent Literature 1: JP2002-103156A

SUMMARY OF INVENTION

Technical Problem

In the conventional structure according to Patent Literature 1, since the large-scale moving unit 11 is provided between the robot arm 6 and the gripping portion 7, the entire structure of the robot becomes complicated. Since the moving unit 11 is provided, a weight capacity of the gripping portion 7 is limited and a movable range of the robot arm 6 is limited. Therefore, the robot is inferior in generality.

Therefore, in order to solve the above problem, an object of the present disclosure is to provide a robot, a robot system, and a robot operation method that simplify a structure and are excellent in generality as compared with the conventional structure.

Solution to Problem

In order to solve the above problem, a robot according to the present disclosure includes:

a robot hand attached to a distal end portion of a robot arm; and a control unit configured to control each operation of the robot arm and the robot hand to perform a work on an object, in which the robot hand includes a force sensor, and the control unit controls the operation of the robot arm such that the force sensor detects position information and posture information on the object by pressing a part of the robot hand against the object.

According to the robot of the present disclosure, by detecting the position information and the posture information on the object using the force sensor, it is possible to achieve a robot that simplifies a structure and is excellent in generality as compared with the conventional structure.

Any combination of at least two configurations disclosed in the claims and/or the description and/or the drawings is included in the present invention. In particular, any combination of at least two terms of the claims is also included in the present invention.

BRIEF DESCRIPTION OF DRAWINGS

The present invention will be more clearly understood from the following description of preferred embodiments with reference to the accompanying drawings. However, the embodiments and the drawings are provided for the purpose of illustration and description only, and should not be used to define the scope of the present invention. The scope of the present invention is defined by the accompanying claims. In the accompanying drawings, the same component numbers in a plurality of drawings indicate the same components.

DESCRIPTION OF EMBODIMENTS

Hereinafter, an embodiment according to the present disclosure will be described with reference to the drawings, but the present disclosure is not limited to the present embodiment.

<Overall Configuration of Robot System>

Figure 1:
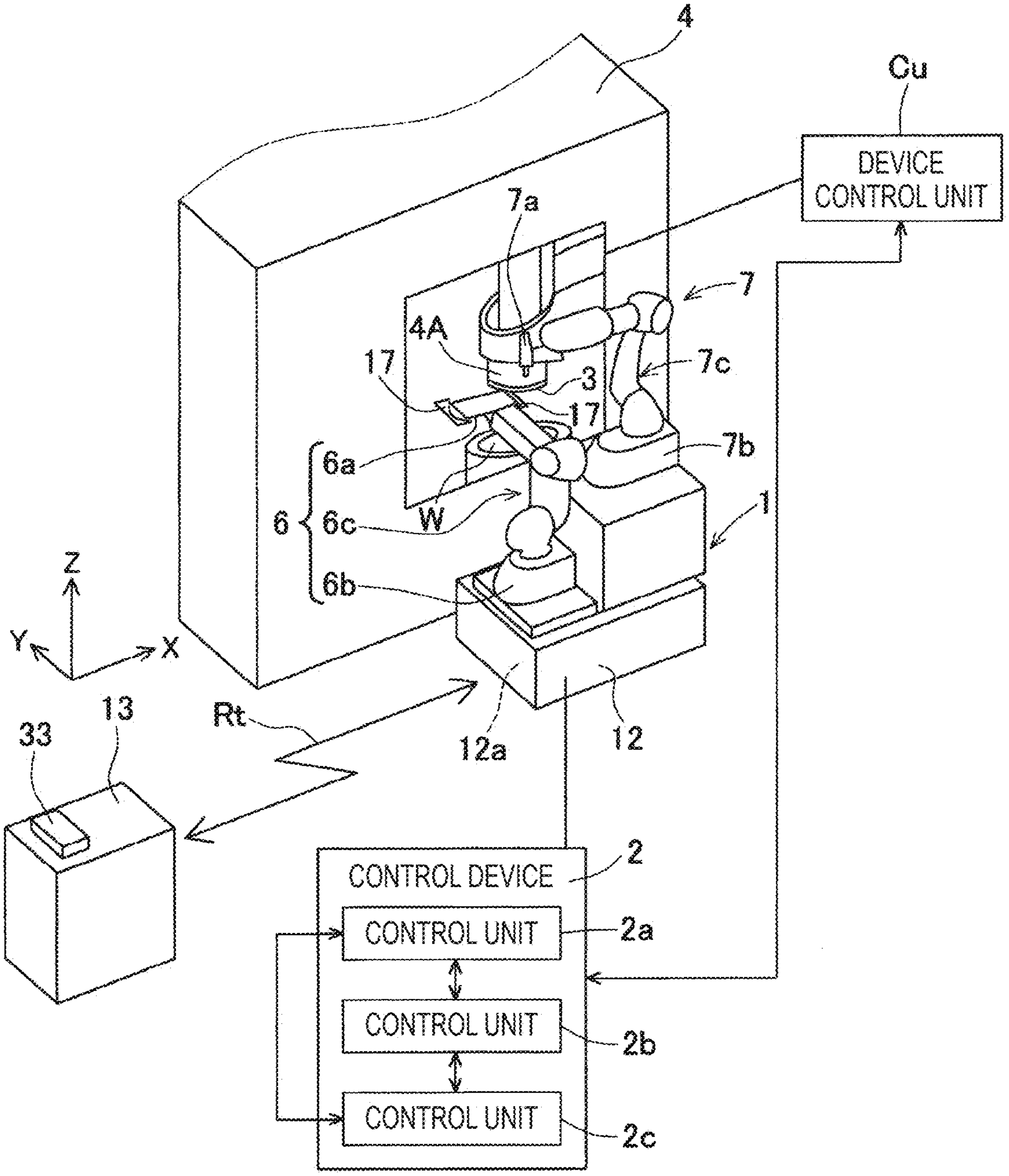
FIG. 1 is a perspective view of a robot system according to an embodiment of the present disclosure.

A robot system 1 shown in FIG. 1 is, for example, a system in which a component 3 as an object is automatically replaced by a control device 2 with respect to a working device 4. The robot system 1 includes a conveyance table 12, a component conveyance robot 6, and a bolt tightening and loosening robot 7. The working device 4 includes a device main body 4A, and the component 3 is detachably attached to the device main body 4A.

Figure 12:
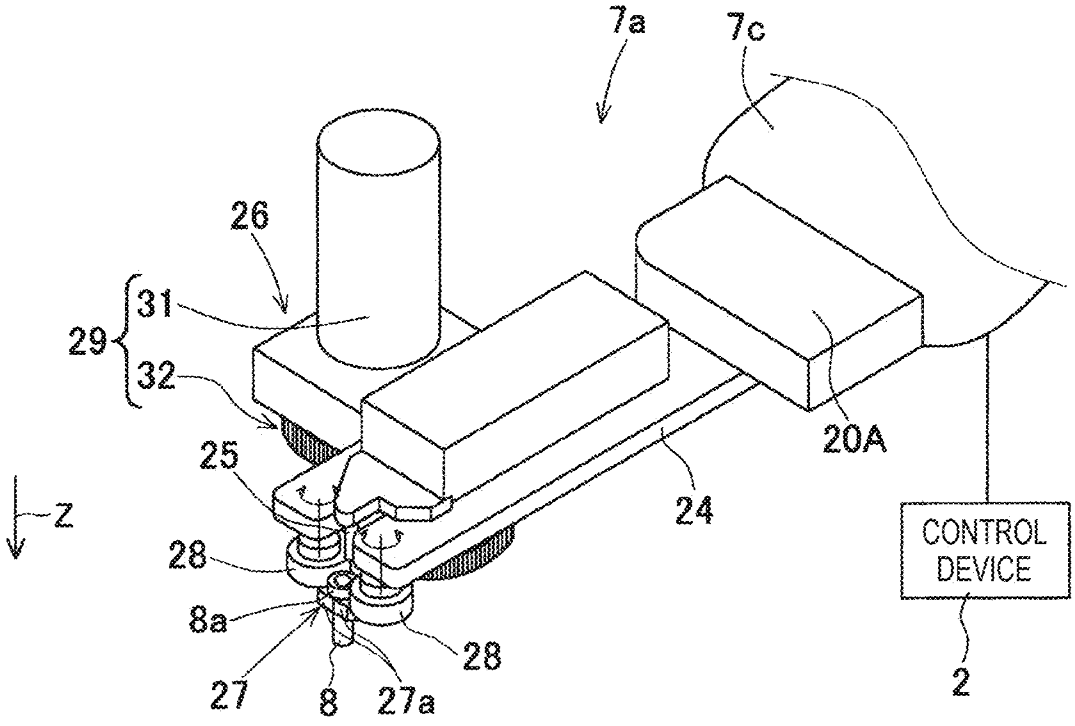
FIG. 12 is a perspective view of a robot hand for bolt tightening and bolt loosening of the same robot system.

The component conveyance robot 6 includes a robot hand 6*a* for component conveyance, and the bolt tightening and loosening robot 7 includes a robot hand 7*a* for bolt tightening and bolt loosening. The robot hand 6*a* for component conveyance is capable of gripping and conveying the component 3, and attaches and detaches the component 3 to and from the device main body 4A. The robot hand 7*a* for bolt tightening and bolt loosening can freely attach and detach the component 3 to and from the device main body 4A by a bolt 8 (FIG. 12).

The control device 2 controls the entire robot system 1. The control device 2 includes a control unit 2*a* used for the component conveyance robot 6, a control unit 2*b* used for the bolt tightening and loosening robot 7, and a control unit 2*c* used for the conveyance table 12. Hereinafter, a robot main body of the component conveyance robot 6 excluding the control unit 2*a* may be simply referred to as the robot 6, and a robot main body of the bolt tightening and loosening robot 7 excluding the control unit 2*b* may be simply referred to as the robot 7.

<Working Device>

Figure 3:
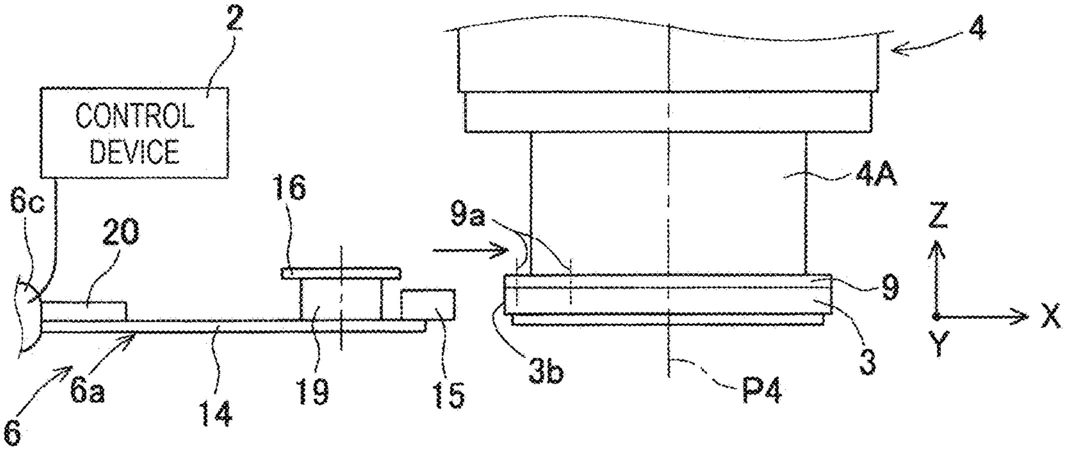
FIG. 3 is a diagram explaining a method of detecting a position of a working device of the same robot system in X and Y directions.

The working device 4 is fixed to an installation surface such as a floor, and the conveyance table 12 supporting the robots 6, 7 moves relative to the fixed working device 4. FIG. 3 shows a three-dimension orthogonal coordinate system as a coordinate system defining a space in which the working device 4 is installed. The three-dimension orthogonal coordinate system is defined by an X axis and a Y axis that are orthogonal to each other on a horizontal plane, and a Z axis whose positive direction is upward in a vertical direction. The device main body 4A is driven to rotate around the Z axis, and can be driven in a Z direction relative to a workpiece W (FIG. 1) supported below the device main body 4A.

For example, a flange 9 for attaching and detaching the component 3 for machining is provided at a lower end portion of the device main body 4A in the Z direction. The flange 9 has a circular plate shape coaxial with the Z axis and has a plurality of bolt insertion holes 9*a* in an outer peripheral portion thereof. The plurality of bolt insertion holes 9*a* are arranged at regular intervals in a circumferential direction, and each bolt insertion hole 9*a* is a through hole formed parallel to the Z axis. The bolt 8 as a fastener shown in FIG. 13A can be mounted to each bolt insertion hole 9*a* from above the flange 9. A hexagon socket head bolt is applied as the bolt 8. The hexagon socket head bolt may be simply referred to as a bolt.

<Component>

Figure 4:
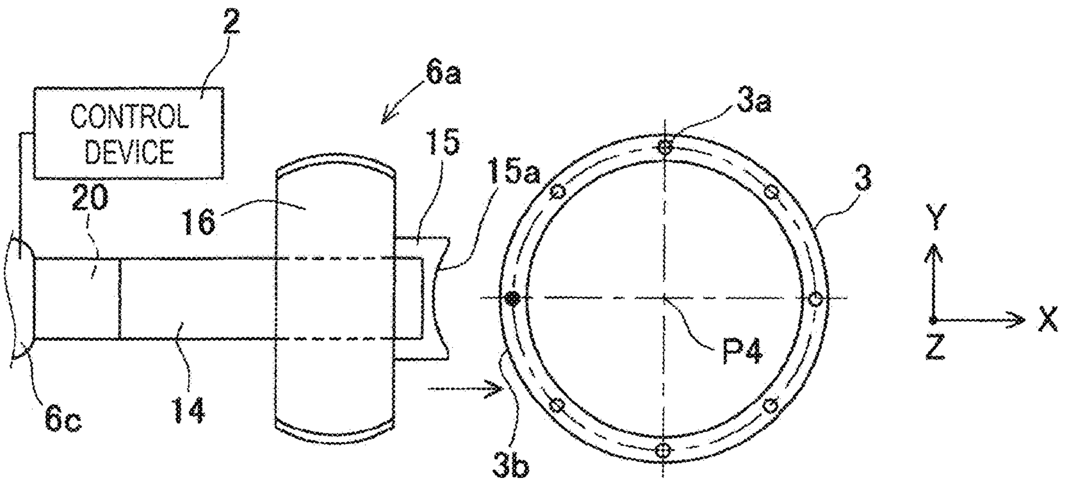
FIG. 4 is a plan view partially showing the same working device and the robot hand.
Figure 7A:
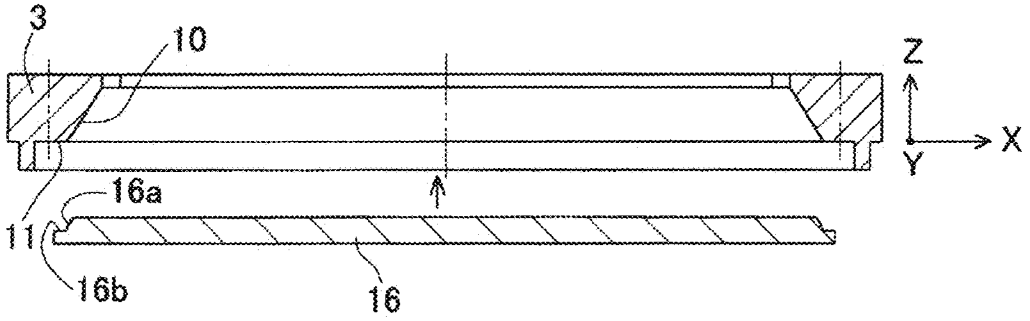
FIG. 7A is a cross-sectional view of the components and the like showing a state in which a second jig of the robot hand is moved in a Z direction to a second engaged portion of the same component.

The component 3 attached to the flange 9 in FIG. 3 is a ring-shaped component that has an outer periphery having the same diameter as an outer periphery of the flange 9. The component 3 is provided with a plurality of bolt holes 3*a* (FIG. 4) communicating with the respective bolt insertion holes 9*a* of the flange 9. The respective bolt holes 3*a* of the component 3 shown in FIG. 4 are female screws. As shown in FIG. 7A, an annular tapered portion 10 and an annular stepped portion 11 connected to the tapered portion 10 are provided on an inner periphery of the ring-shaped component 3. The tapered portion 10 is an annular portion that is provided on a lower surface of the component 3 and has a tapered shape in which the diameter increases downward from an upper end portion in the Z direction. The stepped portion 11 is connected to a lower end edge portion having the largest diameter of the tapered portion 10 in the Z direction.

<Robot System>

As shown in FIG. 1, each of the robots 6, 7 is a vertical articulated robot, and is supported on the conveyance table 12 with a predetermined step. The robot 7 is supported on an upper step portion of the conveyance table 12, and the robot 6 is supported on a lower step portion of the conveyance table 12. The conveyance table 12 can perform conveyance along, for example, a predetermined conveyance route Rt between the working device 4 and a component collection table 13. The conveyance table 12 is provided with a component housing portion 12*a* capable of housing the component 3 and the like.

<Component Conveyance Robot>

The robot 6 includes a base 6*b*, a plurality of robot arms 6*c* having a plurality of joints, and the robot hand 6*a* for component conveyance. The base 6*b* is fixed to the lower step portion of the conveyance table 12. The plurality of robot arms 6*c* are sequentially connected to the conveyance table 12 via the base 6*b*, and the robot hand 6*a* is attached to a distal end portion of the robot arm 6*c* on the distal end side. A motor provided at the joint is provided with an angle detection sensor for detecting a rotation angle of the same motor.

Figure 2:
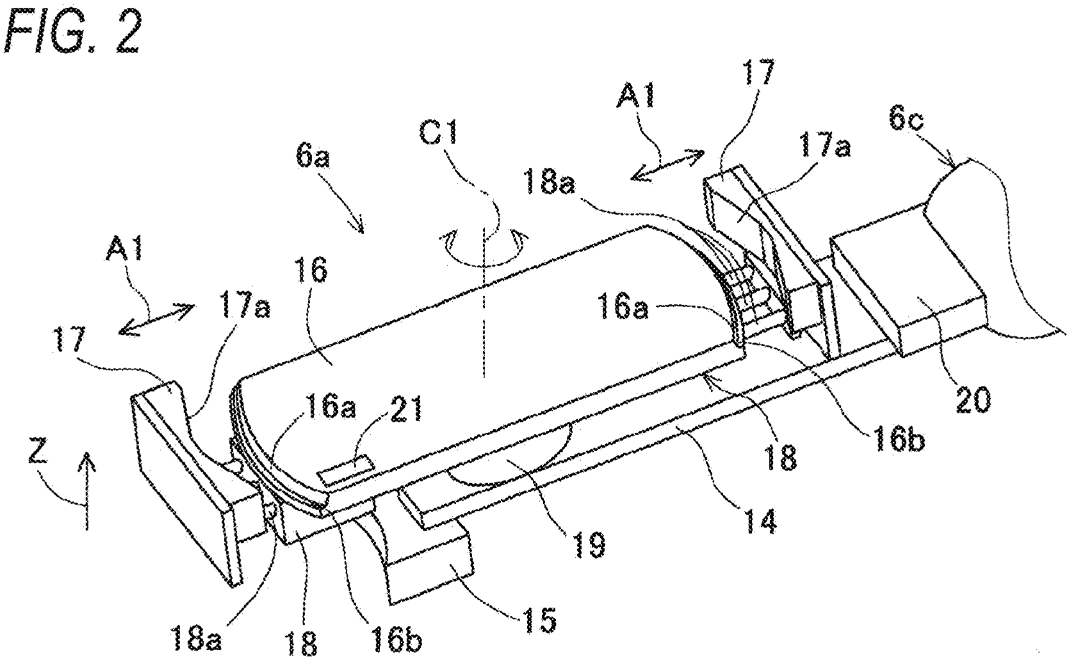
FIG. 2 is a perspective view of a robot hand for component conveyance of the same robot system.

The robot hand 6*a* shown in FIG. 2 includes a hand main body 14, first and second jigs 15 and 16, component gripping portions 17, gripping portion drive sources 18, a rotational drive source 19, and sensors. The sensors include a force sensor 20 and a detection sensor 21. The rectangular plate-shaped hand main body 14 is attached to the distal end portion of the robot arm 6*c*. As shown in FIG. 3, the first jig 15 is fixed to a distal end portion of the hand main body 14 in a longitudinal direction. The first jig 15 detects a position of the device main body 4A in X and Y directions.

As shown in FIG. 4, a first engaging portion 15*a*, which has a concave curved surface shape in which a central portion in a width direction is recessed, is provided at a distal end portion of the first jig 15. The first engaging portion 15*a* is engaged with a first engaged portion 3*b* which is an outer peripheral portion of the component 3. The first engaged portion 3*b* is a portion of an outer peripheral surface (one side surface) of the component 3 in a predetermined circumferential range. The first engaging portion 15*a* is set to have the same curvature as that of the first engaged portion 3*b*, and can abut against the first engaged portion 3*b* without a gap. The predetermined circumferential range is set by, for example, one or both of a test and a simulation.

Figure 8:
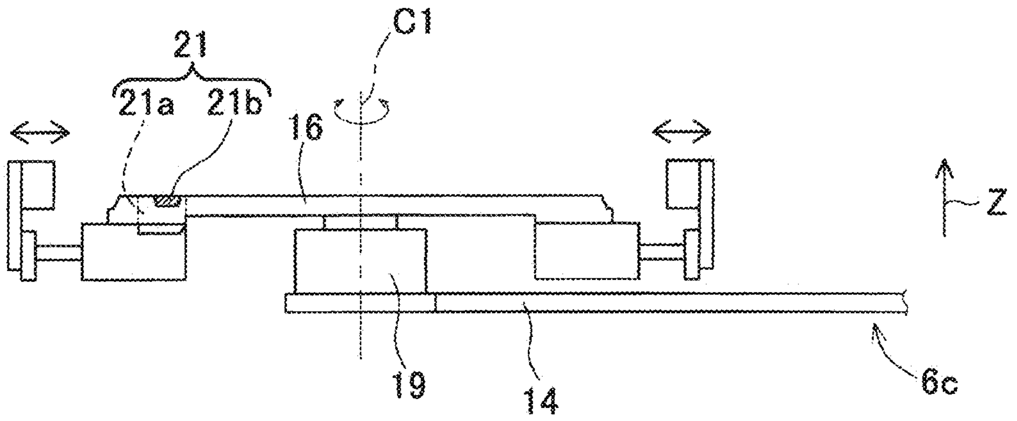
FIG. 8 is a front view of the same robot hand.

As shown in FIG. 2, the second jig 16 is rotatably supported at the distal end portion of the hand main body 14 in the longitudinal direction via the rotational drive source 19. The second jig 16 detects a position in the Z direction and an inclination of the device main body 4A in FIG. 3. As shown in FIG. 8, the second jig 16 has a plate shape parallel to the hand main body 14. For example, a motor is applied as the rotational drive source 19, and the second jig 16 rotates about a rotation axis C1 of the motor.

Figure 7B:
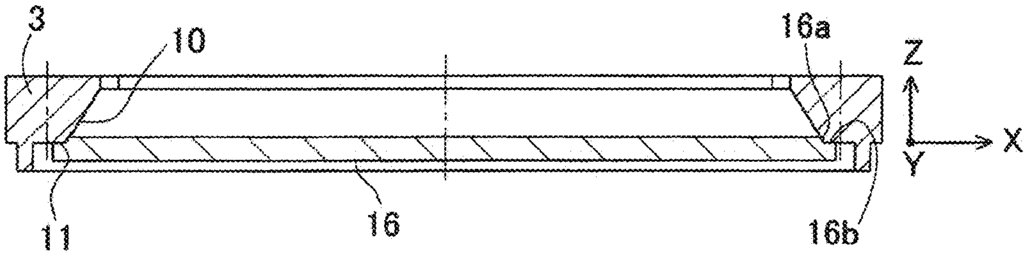
FIG. 7B is a cross-sectional view of the components and the like showing a state in which engaging portions of the second jig are engaged with the same second engaged portion in the Z direction.

As shown in FIG. 2, second engaging portions 16*a* and step portions 16*b* connected to the second engaging portions 16*a* are provided at both end edge portions of the second jig 16 in the longitudinal direction. The second engaging portion 16*a* has a tapered shape that is engaged with a second engaged portion that corresponds to the tapered portion 10 of the component 3 shown in FIG. 7A. The second engaging portions 16*a* and the second engaged portion 10 are set to have the same gradient. As shown in FIG. 7B, when the second engaging portions 16*a* are engaged with the tapered portion 10 of the component 3, the step portions 16*b* of the second jig 16 abut against the stepped portion 11 of the component 3.

The gripping portion drive sources 18, the component gripping portions 17, and the detection sensor 21 are fixed to the second jig 16 in FIG. 2. The pair of gripping portion drive sources 18, 18 for driving the component gripping portions 17 are fixed to both end portions of the second jig 16 in the longitudinal direction. An air cylinder is applied as the gripping portion drive source 18. A cylinder main body of the air cylinder can protrude and retract rods 18*a* in a radial direction A1 orthogonal to the rotation axis C1.

The component gripping portions 17, 17 that hold the outer peripheral surface of the circular component 3 (FIG. 7A) are attached to distal end portions of the rods 18*a*, 18*a* on both sides in the radial direction. The component gripping portions 17, 17 are provided with recessed portions 17*a*, 17*a* facing each other. Each component gripping portion 17 has a substantially V shape in a plan view in which a central portion of the recessed portion 17*a* is recessed outward in the radial direction. When the rods 18*a* are protruded, the recessed portions 17*a*, 17*a* are positioned outward in the radial direction with respect to the outer peripheral surface of the component 3 (FIG. 7A), and thus the component gripping portions 17, 17 detach the component 3 (FIG. 7A). When the rods 18*a* are retracted, the component gripping portions 17, 17 grip the outer peripheral surface of the component 3 (FIG. 7A) by the recessed portions 17*a*, 17*a*.

<Force Sensor>

The force sensor 20 is fixed to a base portion of the hand main body 14 in the longitudinal direction. The force sensor 20 shown in FIG. 3 detects position information and posture information on the component 3 attached to the device main body 4A. The force sensor 20 is a so-called 6-axis force sensor capable of measuring forces in the X, Y, and Z directions and torques around the X, Y, and Z axis. As the 6-axis force sensor, for example, a strain gauge type force sensor is adopted. A force sensor 20A provided in the robot hand 7*a* in FIG. 12, which will be described later, is also a similar 6-axis force sensor.

<Control Device>

The respective control units 2*a*, 2*b*, and 2*c* of the control device 2 in FIG. 1 mutually transmit and receive various signals such as operation completion to synchronize operation timings of the robots 6, 7 and the conveyance table 12. For example, the control device 2 controls the robots 6, 7 and the conveyance table 12 in accordance with a stored movement program or the like. For example, a computer numerical control device is adopted as a device control unit Cu controlling the working device 4, and controls the working device 4 in accordance with a stored machining program. The device control unit Cu determines a replacement timing of the component 3 based on the detection of wear or the like of the component 3 as a consumable or an operation time of the working device 4. When determining that the replacement timing of the component 3 has reached, the device control unit Cu outputs a replacement command for replacing the component 3 to the control device 2 of a robot system 1. When the replacement command is input from the device control unit Cu, the control device 2 causes the robots 6, 7 and the conveyance table 12 to automatically perform a replacement work of the component 3.

The control device 2 controls an operation of the robot 6 in FIG. 1 so as to acquire the position information and the posture information on the component 3 attached to the device main body 4A via the detection by the force sensor 20 shown in FIG. 3 when the working device 4 and the robots 6, 7 approach each other. The control device 2 detects the position information in the X, Y, and Z directions and the posture information on the component 3 each time the working device 4 and the robots 6, 7 approach each other or move away from each other.

<Detection Sensor and the Like>

As shown in FIG. 2, the detection sensor 21 is attached to one end portion of the second jig 16 in the longitudinal direction. The detection sensor 21 can detect a reference position Ps in FIG. 9 of the component 3 attached to the device main body 4A in FIG. 3. As the detection sensor 21 shown in FIG. 8, for example, a laser type distance sensor is applied. The laser type distance sensor includes a laser irradiation unit 21*a* and a light receiving sensor portion 21*b*. The laser irradiation unit 21*a* irradiates a component positioned above the second jig 16 in the Z direction with laser light. The light receiving sensor portion 21*b* receives reflected light of the laser light. The detection sensor 21 uses a principle that a light receiving spot of the reflected light is different depending on a height of a detection portion of the component.

Figure 10:
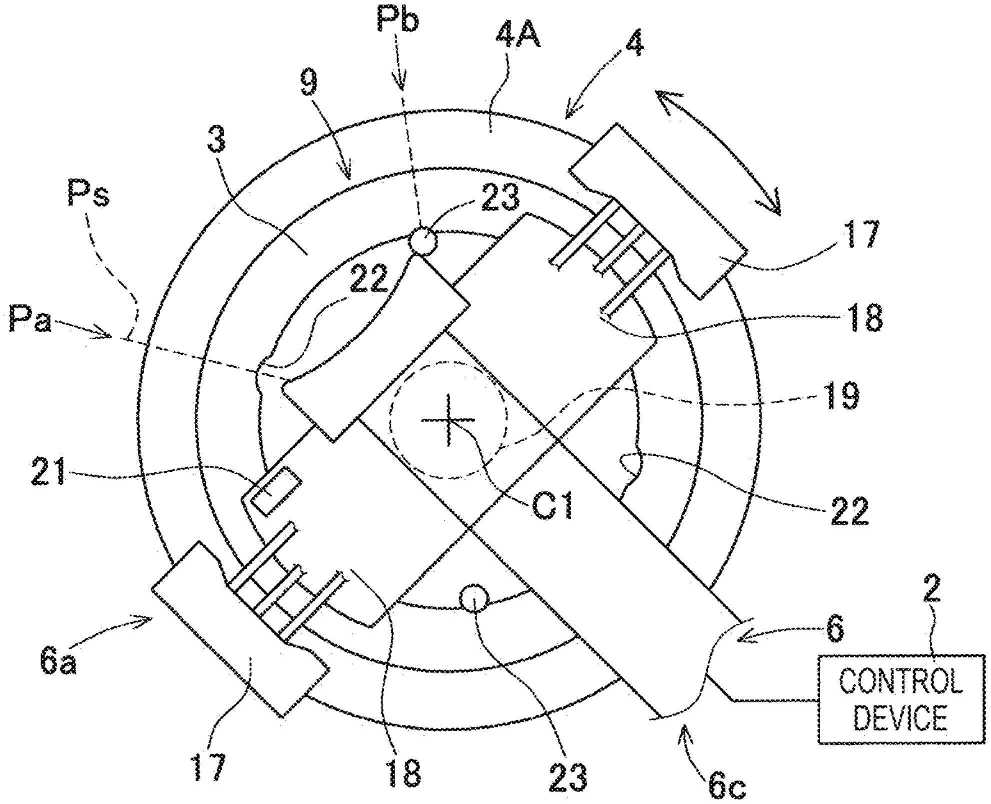
FIG. 10 is a bottom view of the robot hand and the like showing a state in which a reference position of the same detachment allowing portion is detected.

The control device 2 in FIG. 10 controls the operation of the robot 6 so as to detect the reference position Ps of the component 3 attached to the device main body 4A by the detection sensor 21 when the working device 4 and the robot 6 approach each other.

The control device 2 can displace the component 3 between a support position Pa and a detachment position Pb with respect to the flange 9 by the robot hand 6*a*. The control device 2 drives the pair of gripping portion drive sources 18, 18 to grip the component 3 by the component gripping portions 17, 17, and drives the motor 19. Accordingly, the control device 2 can displace the component 3 from which the bolt 8 is detached, between the support position Pa and the detachment position Pb.

The support position Pa is a position in which the component 3 from which the bolt 8 is detached is supported so that the component 3 does not fall off with respect to the flange 9 of the device main body 4A. The detachment position Pb is a position in which the component 3 falls off with respect to the flange 9. On an inner peripheral surface of the component 3, a detachment allowing portion 22 that allows the detachment of the component 3 with respect to the device main body 4A at the detachment position Pb is provided. The detachment allowing portion 22 refers to a pair of notch portions 22, 22 shown in FIG. 10 in which a portion of the tapered portion 10 of the component 3 in FIG. 7A in the circumferential direction is cut out in an arc shape. The pair of notch portions 22, 22 face each other at equi-angular positions of 180 degrees on the inner peripheral surface of the component 3.

A pair of fall prevention plates 23, 23 for preventing falling off of the component 3 are supported by the flange 9. The pair of fall prevention plates 23, 23 are supported at an outer peripheral end portion on a lower surface of the flange 9. Each fall prevention plate 23 has a circular plate shape in the bottom view in FIG. 10. In the outer peripheral end portion of the flange 9, the fall prevention plates 23, 23 are disposed at the equiangular positions of 180 degrees around the rotation axis C1 of the motor 19. A position in which phases of the pair of notch portions 22, 22 are matched with phases of the fall prevention plates 23, 23 of the component 3 refers to the detachment position Pb in the component 3.

At the detachment position Pb, outer edge portions of the pair of fall prevention plates 23, 23 coincide with the arcs of the pair of notch portions 22, 22 in the bottom view in FIG. 10. Accordingly, the component 3 can be detached with respect to the device main body 4A. A position in the component 3 in which the phases of the pair of notch portions 22, 22 are shifted by about 60 degrees with respect to the fall prevention plates 23, 23 refers to the support position Pa. At the same support position Pa, portions of the component 3 in the circumferential direction shifted by about 60 degrees from the positions of the notch portions 22, 22 are supported by the fall prevention plates 23, 23.

Figure 9:
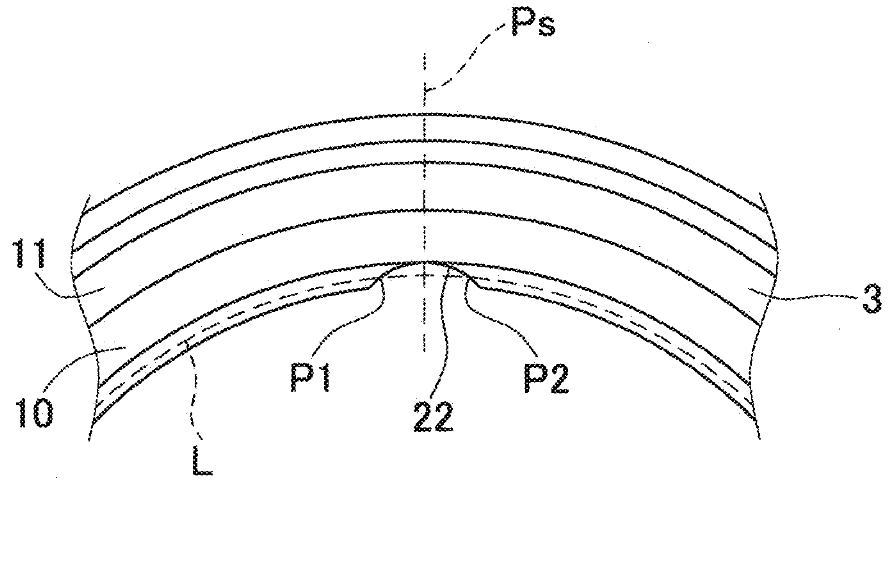
FIG. 9 is a bottom view showing an enlarged detachment allowing portion of the same component.

As shown in FIG. 9, the reference position Ps of the component 3 is provided in one or both of the notch portions 22. The control device 2 shown in FIG. 10 calculates an intermediate point between first and second steps P1, P2, which are intersection points between a trajectory L of an irradiation point of the laser light shown in FIG. 9 and the notch portion 22. The control device 2 in FIG. 10 calculates the reference position Ps as a reference angle passing through the center of the component 3 shown in FIG. 9 and the intermediate point. Positions of the bolt holes in the component 3 are obtained based on the reference position Ps. The control device 2 in FIG. 1 detects the reference position Ps of the notch portion 22 in FIG. 9 each time the working device 4 and the robots 6, 7 approach each other or move away from each other.

<Bolt Tightening and Loosening Robot>

As shown in FIG. 1, the robot 7 includes a base 7*b*, a plurality of robot arms 7*c* having a plurality of joints, and the robot hand 7*a* for bolt tightening and bolt loosening. The base 7*b* is fixed to the upper step portion of the conveyance table 12. The plurality of robot arms 7*c* are sequentially connected to the conveyance table 12 via the base 7*b*, and the robot hand 7*a* is attached to a distal end portion of the robot arm 7*c* on the distal end side. A motor provided at the joint includes an angle detection sensor for detecting a rotation angle of the same motor.

The robot hand 7*a* shown in FIG. 12 includes a hand frame 24, a tool 25, a roller drive system 26, a bolt gripping device 27, and sensors. The sensors include the force sensor 20A and a height detection unit 30 shown in FIG. 14. The rectangular plate-shaped hand frame 24 is attached to the distal end portion of the robot arm 7*c* in FIG. 12.

<Bolt Tightening and Bolt Loosening by Hexagon Bit>

A hexagon bit as the tool 25 is fixed to a distal end portion of the hand frame 24 in the longitudinal direction. The hexagon bit 25 is inserted into a hexagon socket 8*b* of a head 8*a* of the hexagon socket head bolt 8, and attaches and detaches the bolt 8. The force sensor 20A is fixed to a base portion of the hand frame 24 in the longitudinal direction. The force sensor 20A is used to attach and detach the bolt 8.

<Bolt Tightening and Bolt Loosening by Roller Drive System>

The roller drive system 26 includes rotary rollers 28 and a drive device 29 that applies a rotational drive force to the rotary rollers 28. The two rotary rollers 28, 28 are rotatably supported at the distal end portion of the hand frame 24 in the longitudinal direction. The rotary rollers 28, 28 are supported around an axis parallel to a thickness direction of the hand frame 24 at a predetermined interval.

Figure 14:
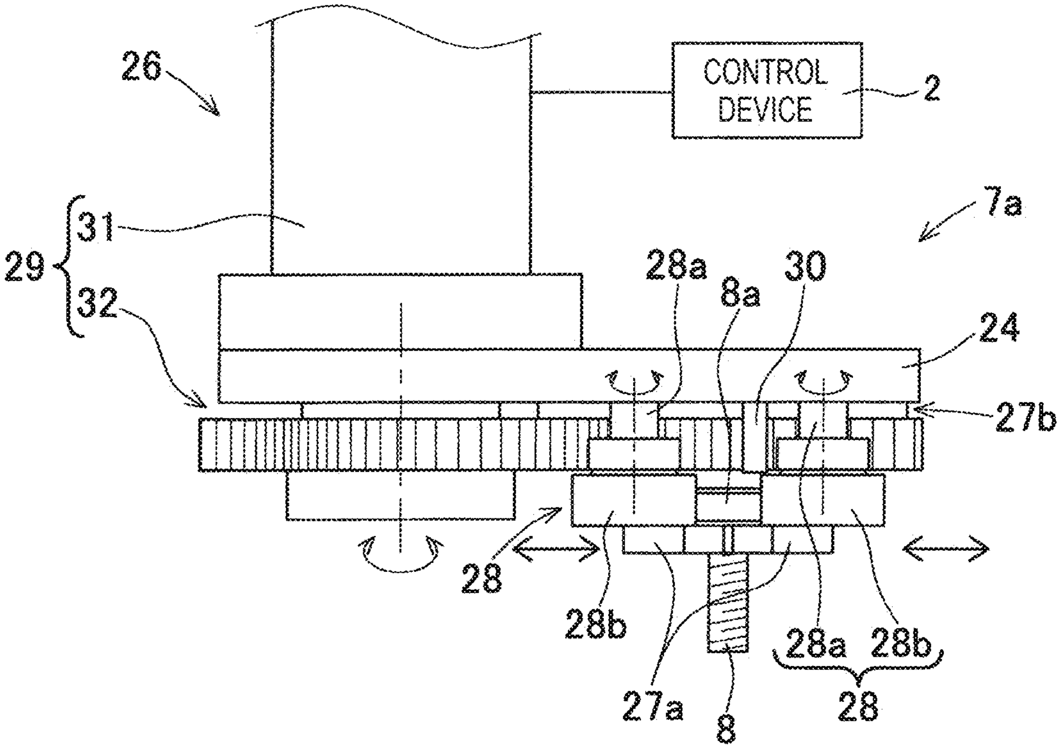
FIG. 14 is a side view of the same robot hand.

As shown in FIG. 14, each rotary roller 28 includes a rotary shaft 28*a* supported by the hand frame 24 and an annular elastic member 28*b* coaxially provided at a distal end portion of the rotary shaft 28*a*. A rubber or the like is adopted as the elastic member 28*b*. The rotary rollers 28, 28 bring the respective elastic members 28*b* into rolling contact with two side surfaces of the head 8*a* as a part of the bolt 8 to perform temporary tightening or temporary loosening to the bolt 8.

The drive device 29 includes a motor 31 supported by the hand frame 24, and a gear train 32 that transmits a rotational force of the motor 31 to the rotary rollers 28, 28. The gear train 32 reduces the rotational force of the motor 31 and transmits the reduced rotational force to the rotary rollers 28, 28.

The force sensor 20A in FIG. 12 is a pressing force detection unit that detects a pressing force of the rotary rollers 28 against the bolt 8. As shown in FIG. 1, the control device 2 positions the robot hand 7*a* based on the pressing force detected by the pressing force detection unit 20A in FIG. 12 when the working device 4 and the robots 6, 7 approach each other. When the pressing force by the rotary rollers 28 acts on the head 8*a* of the bolt 8, the force sensor 20A detects a reaction force of the pressing force.

Figure 15A:
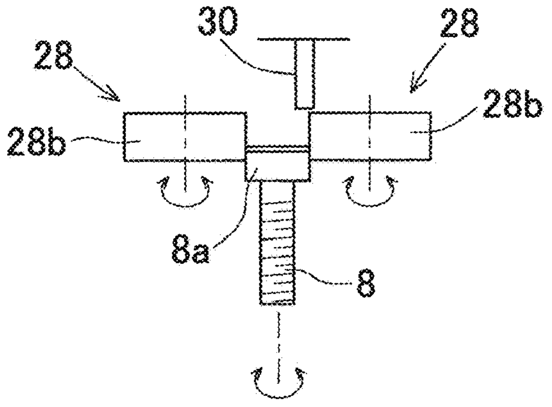
FIG. 15A is a diagram showing a state in which rotary rollers of the robot hand are brought into rolling contact with the same bolt.

The height detection unit 30 for detecting the height of the bolt 8 with respect to the component is attached to the distal end portion of the hand frame 24 in FIG. 14 in the longitudinal direction. A proximity sensor is adopted as the height detection unit 30. As shown in FIG. 15A, a detection portion of the proximity sensor 30 faces the elastic members 28*b* with a predetermined gap therebetween, for example.

The bolt gripping device 27 that grips the neck of the bolt 8 is supported at the distal end portion of the hand frame 24 in FIG. 12 in the longitudinal direction. The bolt gripping device 27 includes chucks 27*a* for gripping the bolt 8 and a drive source 27*b* used for the chucks 27*a* shown in FIG. 14. The chucks 27*a* grip the neck of the bolt 8 from both left and right sides in an openable and closable manner. An air cylinder for opening and closing the chucks 27*a* is adopted as the drive source 27*b*.

In a case in which the bolt 8 is lifted up and the presence of the head 8*a* of the bolt 8 is detected by the proximity sensor 30 upon loosening the bolt 8, the control device 2 controls the drive source 27*b* so as to grip the neck of the bolt 8 by the chucks 27*a*. Next, the control device 2 drives the robot hand 7*a* so as to take out the bolt 8 from the component in a state in which the bolt 8 is gripped by the chucks 27*a*. For example, once the taken-out bolt 8 is supported by a support base of the working device 4 in FIG. 1, the bolt 8 is reused at the time of replacing the component 3. The bolt 8 can be temporarily tightened by using a roller drive system 26 in FIG. 14 in accordance with a procedure reverse to that at the time of bolt loosening.

[Operations and Effects of Robot System]

As shown in FIG. 1, when the replacement command from the device control unit Cu is input, the control device 2 moves the robots 6, 7 housing the component 3 for replacement in the conveyance table 12 to proximate positions with respect to the working device 4, and detects the position and the inclination of the working device 4.

<Method of Detecting Position of Working Device in X and Y Directions>

As shown in FIG. 4, the control device 2 moves the robot arm 6*c* in the X and Y directions, which are horizontal directions, such that the first jig 15 fixed to the robot hand 6*a* is pressed against the outer peripheral surface of the component 3.

Figure 5A:
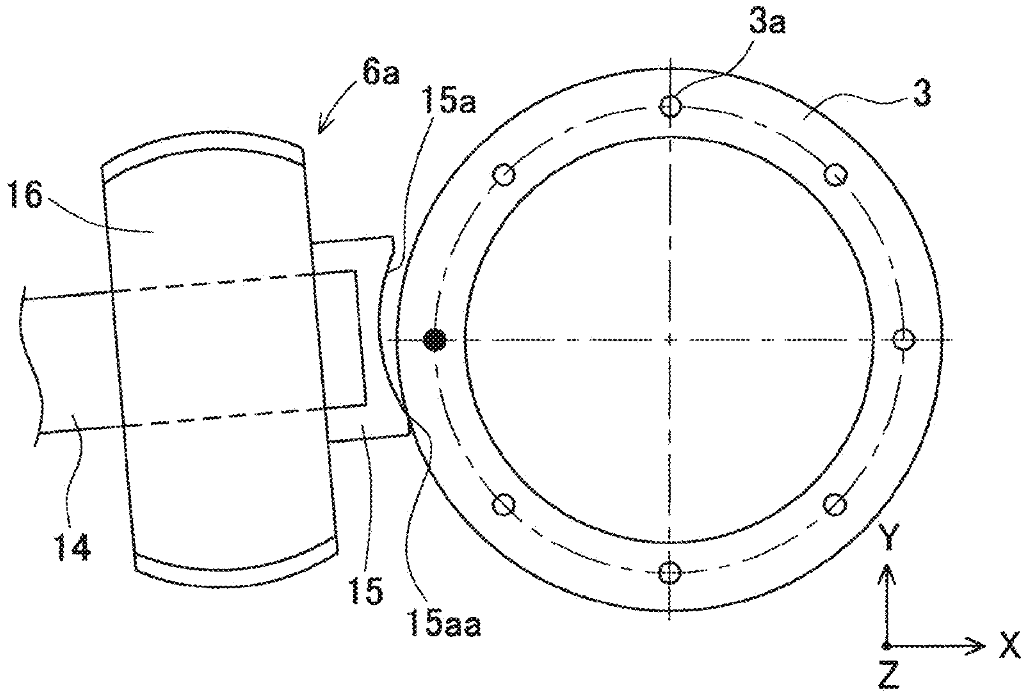
FIG. 5A is a partially enlarged view of components and the like showing a state in which a first jig of the robot hand is pressed against a component attached to the same working device in the X and Y directions.

As shown in FIG. 5A, when an edge portion 15*aa* on one side of the first engaging portion 15*a* abuts against the outer peripheral surface of the component 3, a moment around the Z axis acts on the component 3. At this time, the force sensor 20 in FIG. 3 detects a reaction force of the moment.

Figure 5B:
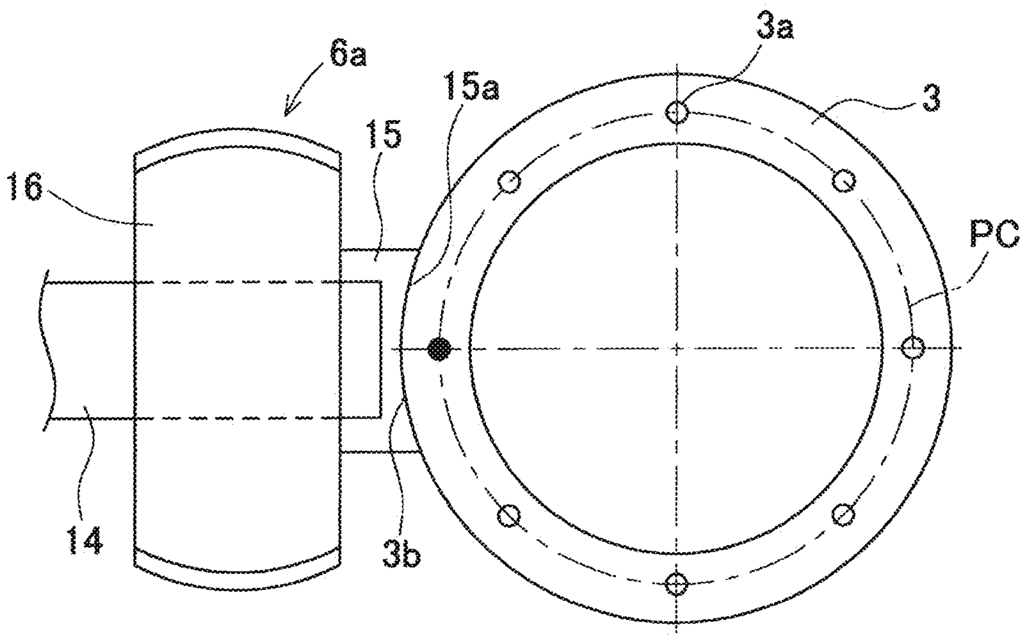
FIG. 5B is a partially enlarged view of the components and the like showing a state in which an engaging portion of the first jig is engaged with a first engaged portion of the same component in the X and Y directions.

While moving the robot arm 6*c* in the X and Y directions in a direction of reducing the reaction force as a sensor output of the force sensor 20, the control device 2 engages the first engaging portion 15*a* of the first jig 15 with the first engaged portion 3*b* of the component 3 as shown in FIG. 5B. When the first engaging portion 15*a* is engaged with the first engaged portion 3*b*, the reaction force of the moment becomes zero.

When the reaction force becomes zero, the control device 2 in FIG. 1 detects a device center P4 in FIG. 4 by acquiring the rotation angles of the motors provided at the joints of the robot arms 6*c* from the angle detection sensors. The "rotation angles" are relative angles with respect to reference angles of the motors at the joints. The reference angle of the motor is synonymous with the origin of the motor in a predetermined reference posture of the robot arm 6*c*. The same also applies to a method of detecting a position in a Z-direction and an inclination of the working device 4 in FIG. 6 to be described later. The device center P4 shown in FIG. 4 is a provisional center of the component 3 attached to the device main body 4A in FIG. 3 in the X and Y directions.

<Method of Detecting Position in Z-Direction and Inclination of Working Device>

Figure 6:
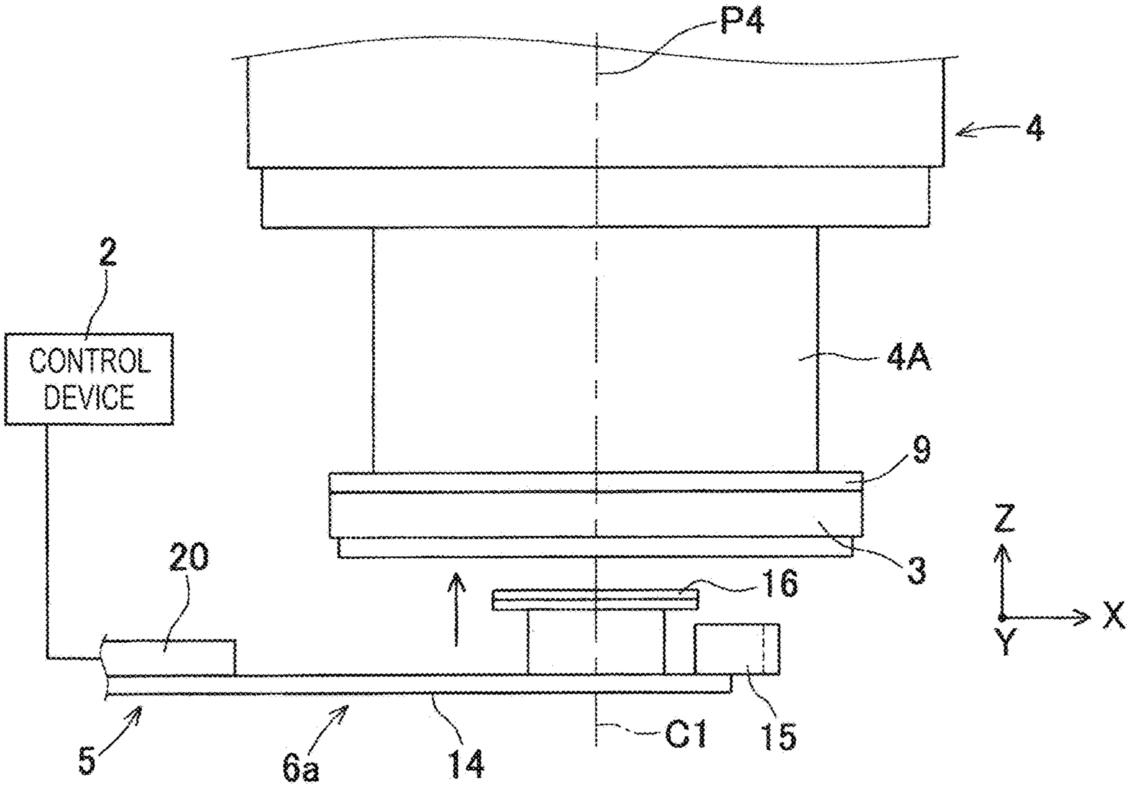
FIG. 6 is a diagram for explaining a method of detecting a position in a Z-direction and an inclination of the same working device.

After the device center P4 is detected, the position in the Z-direction and the inclination of the working device 4 are detected. As shown in FIG. 6, the control device 2 moves a robot arm 6*c* such that the second jig 16 is positioned below the component 3 in the Z direction and the rotation axis C1 of the second jig 16 coincides with the device center P4. As shown in FIG. 7A, the control device 2 moves the robot arm 6*c* in FIG. 2 upward in the Z direction so as to press the second engaging portions 16*a* against the second engaged portion 10.

When a part of each second engaging portion 16*a* abuts against the second engaged portion 10 of the component 3 shown in FIG. 7A, a moment around the Y axis acts on the component 3. At this time, the force sensor 20 in FIG. 6 detects a reaction force of the moment.

While moving the robot arm 6*c* in a direction of reducing the reaction force as a sensor output of the force sensor 20, the control device 2 engages the second engaging portions 16*a* of the second jig 16 in FIG. 7B with the second engaged portion 10 of the component 3. At this time, the step portions 16*b* of the second jig 16 abut against the stepped portion 11 of the component 3. When the second engaging portions 16*a* are engaged with the second engaged portion 10, the reaction force of the moment becomes zero.

When the reaction force becomes zero, the control device 2 in FIG. 1 detects the position in the Z-direction, the inclination, and a final position in the X and Y directions of the working device 4 in FIG. 6 by acquiring the rotation angles of the motors provided at the joints of the robot arms 6*c* from the angle detection sensors. The position in the Z-direction, the inclination, and the final position in the X and Y directions of the working device 4 are position information in the Z direction, posture information, and position information on a final center in the X and Y directions of the component 3 attached to the device main body 4A, respectively. When the second engaging portions 16*a* are engaged with the second engaged portion 10 as shown in FIG. 7B, the provisional center of the component 3 in the X and Y directions is corrected, and the center of the component 3 in the X and Y directions is accurately obtained.

The control device 2 in FIG. 6 engages the second engaging portions 16*a* with the second engaged portion 10 of the component 3 as shown in FIG. 7B based on the sensor output of the force sensor 20, thereby easily and reliably detecting the position information in the X, Y, and Z directions and the posture information on the component 3. Therefore, when the working device 4 and the robots 6, 7 approach each other, the control device 2 in FIG. 1 corrects misalignments in relative positions and the inclination between the working device 4 and the robots 6, 7 based on the position information and the posture information on the component 3. Since the position information and the posture information on the component 3 are detected by the force sensor 20 in FIG. 2, as compared with the conventional structure including the large-scale moving unit described above, it is possible to reduce the number of components to simplify the structure, and increase the weight capacity and the movable range. Therefore, the generality of the entire robot system 1 in FIG. 1 can be improved as compared with the conventional structure. The position information and the posture information on the component 3 are detected by the force sensor 20 shown in FIG. 6 without using a camera or the like, for example. Therefore, even in a case in which a clearance below the component 3 attached to the working device 4 cannot be secured by a distance necessary for imaging, it is possible to reliably correct the misalignments in the relative positions and the inclination between the working device 4 and the robots 6, 7 in FIG. 1.

When the working device 4 and the robots 6, 7 are relatively moved so as to be able to approach each other or move away from each other, the misalignments in the relative positions and the inclination between the working device 4 and the robots 6, 7 may occur. According to this configuration, when the working device 4 and the robots 6, 7 approach each other, the misalignments in the relative positions and the inclination between the working device 4 and the robots 6, 7 are corrected as described above.

<Method of Detecting Reference Position of Notch Portion>

Figure 11:
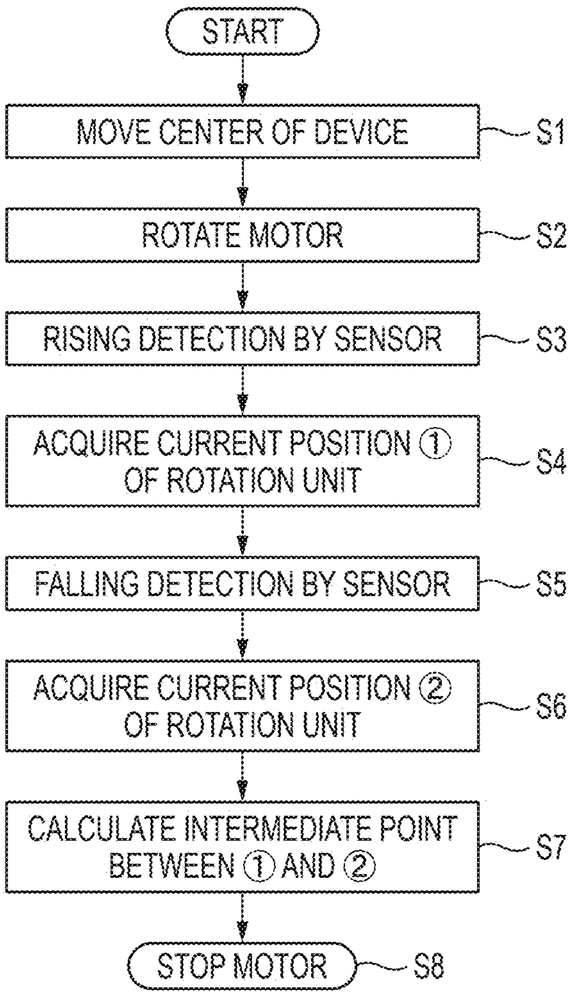
FIG. 11 is a flowchart for detecting the reference position of the same detachment allowing portion.

FIG. 11 is a flowchart for detecting a reference position of a component.

As shown in FIG. 10, when the working device 4 and the robot 6 approach each other, and the component 3 is attached to the flange 9, a process of detecting the reference position Ps starts. The control device 2 moves the robot arm 6*c* in FIG. 10 (FIG. 11: step S1) such that the second jig 16 in FIG. 8 is positioned below the component 3 in the Z direction and the rotation axis C1 of the second jig 16 coincides with the device center P4 (FIG. 4).

Next, the control device 2 drives the motor 19 to rotate by a predetermined angle. Concurrently, the control device 2 causes the laser light to be irradiated from the detection sensor 21 toward the component 3 (FIG. 11: step S2). The trajectory L of the irradiation point of the laser light shown in FIG. 9 is concentric with a pitch circle of the bolt holes 3*a* (FIG. 5B) of the component 3, and passes through an intermediate portion of the notch portion 22 in the radial direction. The pitch circle is a circle PC passing through the centers of the plurality of bolt holes 3*a* of the component 3 shown in FIG. 5B.

When the detection sensor 21 detects rising of a sensor input signal, the control device 2 in FIG. 10 regards the rising as the first step P1 in FIG. 9, and records a rotation angle that is a first current position of the motor 19 shown in FIG. 10 at this detection point (FIG. 11: steps S3 and S4). When the detection sensor 21 detects falling of the sensor input signal, the control device 2 regards the falling as the second step P2 (FIG. 9), and records a rotation angle that is a second current position of the motor 19 at this detection point (FIG. 11: steps S5 and S6). The control device 2 calculates the intermediate point between the recorded first current position P1 and the recorded second current position P2 in FIG. 9 (FIG. 11: step S7). The intermediate point is regarded as the center of the arc of the notch portion 22 in FIG. 10. Thus, the control device 2 can calculate the reference position Ps as the reference angle passing through the center of the component 3 and the intermediate point. Thereafter, the control device 2 stops the drive of the motor 19 and ends the process (FIG. 11: step S8).

<Bolt Loosening Method by Hexagon Bit>

Figure 13A:
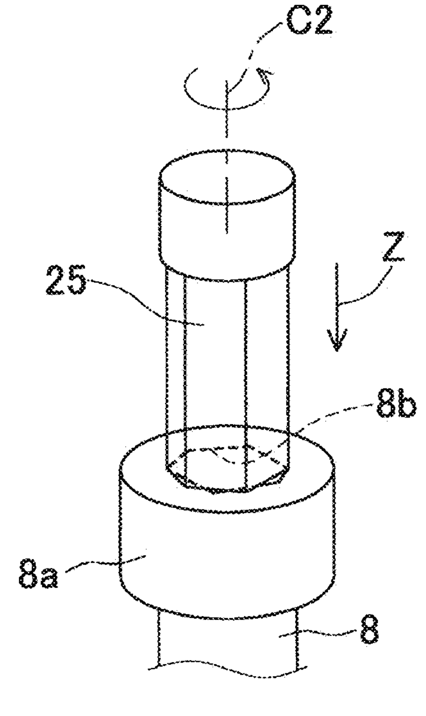
FIG. 13A is a perspective view showing a state in which a tool of the same robot hand is positioned at the center of a bolt hole.

While gripping the component 3 by the component gripping portions 17, 17 of the robot hand 6*a*, the control device 2 positions the hexagon bit 25 to be inserted into a hexagon socket 8*b* as shown in FIG. 13A. The control device 2 in FIG. 12 moves the robot arm 7*c* so as to position a rotation center C2 of the hexagon bit 25 in FIG. 12 at the center of the bolt hole 3*a* (FIG. 5B) of the component 3 calculated based on the reference position Ps of the component 3 in FIG. 10. Specifically, a rotation center C2 of the hexagon bit 25 is matched with the center of the hexagon socket 8*b* of the hexagon socket head bolt 8 in FIG. 13A screwed into the bolt hole 3*a* of the component 3 shown in FIG. 5B.

As shown in FIG. 13A, the control device 2 in FIG. 12 rotates the robot hand 7*a* in FIG. 12 while moving the hexagon bit 25 downward in the Z direction based on the sensor output of the force sensor 20A. That is, the control device 2 rotates the robot hand 7*a* around the rotation center C2 of the hexagon bit 25 to match a phase of the hexagon bit 25 while applying a pressing force by the hexagon bit 25 to the head 8*a* of the hexagon socket head bolt 8. When the downward pressing force in the Z direction by the hexagon bit 25 is applied to the head 8*a* of the hexagon socket head bolt 8, the force sensor 20A detects a reaction force of the pressing force.

Figure 13B:
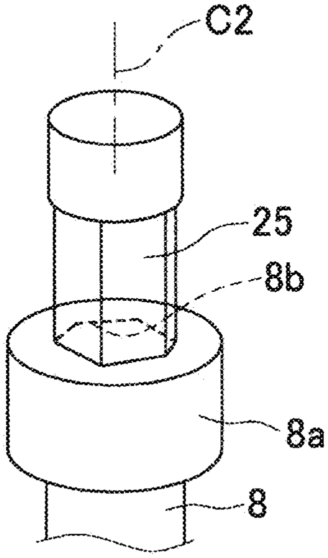
FIG. 13B is a perspective view showing a state in which a phase of the same tool is matched with a bolt.

While monitoring the reaction force, the control device 2 searches for a position in which the phase of the hexagon socket 8*b* of the hexagon socket head bolt 8 shown in FIG. 13A and the phase of the hexagon bit 25 are matched with each other. In FIG. 13A, the hexagon bit 25 is positioned in a phase in which the hexagon socket head bolt 8 cannot be attached to and detached from the component 3 as the object. The control device 2 in FIG. 12 searches for the position in which the phases are matched by using the fact that the reaction force of the pressing force does not act when the phases of the hexagon socket 8*b* and the hexagon bit 25 are matched with each other as shown in FIG. 13B. FIG. 13B shows a state in which the hexagon bit 25 is displaced to the phase in which the hexagon socket head bolt 8 can be attached to and detached from the component.

The control device 2 in FIG. 12 drives the robot hand 7*a* in a state in which the phase of the hexagon bit 25 is matched with the phase of the hexagon socket 8*b* of the hexagon socket head bolt 8. By repeatedly performing the phase matching of the hexagon bit 25 and the drive of the robot hand 7*a*, the bolt loosening by the hexagon bit 25 is completed. The control device 2 can tighten the bolt 8 by the robot hand 7*a* according to the procedure reverse to that at the time of the bolt loosening.

As described above, the hexagon bit 25 is displaced from the phase in which the bolt 8 cannot be attached to and detached from the component to the phase in which the bolt can be attached to and detached from the component based on the sensor output of the force sensor 20A while the pressing force by the hexagon bit 25 is applied to the bolt 8 supported by the component. Therefore, the bolt 8 can be loosened or tightened by repeatedly driving the hexagon bit 25 without interfering with a part of the component or the like. Thus, as compared with the conventional structure using a driver unit or the like, a robot excellent in generality can be adopted without limiting an object as a work target or the like.

<Bolt Loosening Method by Roller Drive System>

After the bolt loosening by the hexagon bit 25, the control device 2 causes the bolt 8 to press the rotary rollers 28, 28 in FIG. 14 while causing the component gripping portions 17, 17 in FIG. 2 to hold the component, and detects the reaction force of the pressing force by the force sensor 20A in FIG. 12. The control device 2 presses the rotary rollers 28, 28 against the side surfaces of the head 8*a* of the bolt 8 so as to provide the pressing force that enables the bolt tightening and the bolt loosening while monitoring the reaction force. The pressing force that enables the bolt tightening and the bolt loosening can be set in advance by a simulation, a test, or the like. After a desired pressing force is reached, the control device 2 controls the drive device 29 in FIG. 14 so as to apply the rotational drive force to the rotary rollers 28 as shown in FIG. 15A.

Figure 15B:
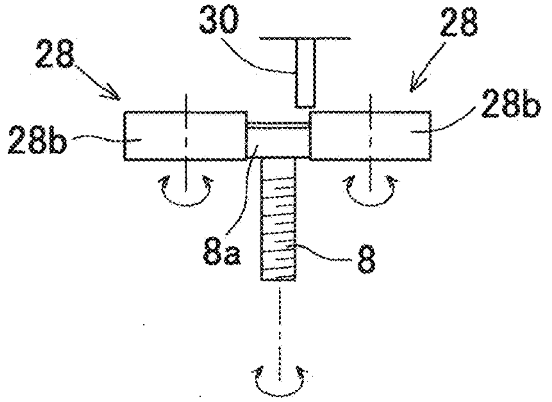
FIG. 15B is a diagram showing a state in which the same bolt is detached from the component by the rotary rollers.

When the bolt 8 is loosened by the roller drive system 26 as shown in FIG. 15B, the bolt 8 is lifted up such that the head 8*a* of the bolt 8 approaches the hand frame 24 (FIG. 14). Therefore, by detecting the presence of the head 8*a* of the bolt 8 by the proximity sensor 30, so-called idle rotation of the rotary rollers 28 can be prevented.

In the case in which the bolt 8 is lifted up and the presence of the head 8*a* of the bolt 8 is detected by the proximity sensor 30 upon loosening the bolt 8, the control device 2 in FIG. 14 controls the drive source 27*b* so as to grip the neck of the bolt 8 by the chucks 27*a*. Next, the control device 2 drives the robot hand 7*a* so as to take out the bolt 8 from the component 3 shown in FIG. 1 in the state in which the bolt 8 is gripped by the chucks 27*a*. Once the taken-out bolt 8 in FIG. 14 is supported by the predetermined support base, the bolt 8 is reused at the time of replacing the component 3 (FIG. 1). The roller drive system 26 can temporarily tighten the bolt 8 in accordance with the procedure reverse to that at the time of the bolt loosening.

After taking out the bolt 8 from the component 3 in FIG. 1, the control device 2 drives the motor 19 in FIG. 10 in a state in which the component 3 is gripped by the component gripping portions 17, 17, and displaces the component 3 to the detachment position Pb. The control device 2 drives the robot hand 6*a* to house the component 3 in the component housing portion 12*a* of the conveyance table 12 in FIG. 1. Next, the control device 2 drives the robot hand 6*a* so as to grip the component 3 for replacement by the component gripping portions 17, 17, and displace the component 3 to the support position Pa in FIG. 10 with respect to the device main body 4A.

The control device 2 temporarily tightens the bolt 8 by the roller drive system 26 in FIG. 12 in accordance with the procedure reverse to that at the time of the bolt loosening. Next, the control device 2 tightens the bolt 8 by the hexagon bit 25 in FIG. 12 in accordance with the procedure reverse to that at the time of the bolt loosening while gripping the component 3 by the component gripping portions 17, 17 in FIG. 1. At the time of the bolt loosening, torque management of a tightening torque is performed by the force sensor 20A. The control device 2 drives the robot hand 7*a* to swing in a predetermined direction so as to tighten the hexagon socket head bolt 8 by a defined tightening torque based on the sensor output of the force sensor 20A. By repeatedly performing the phase matching of the hexagon bit 25 and the drive of the robot hand 7*a*, the defined tightening torque is satisfied. The tightening torque based on the force sensor 20A is periodically calibrated by, for example, a torque calibration device 33 provided in the component collection table 13 or the like in FIG. 1.

Thereafter, the control device 2 moves the conveyance table 12 to the component collection table 13, and drives the robot 6 so as to grip the used component 3 by the component gripping portions 17, 17 and support the used component 3 at a predetermined position.

<Modifications>

A predetermined work of the working device 4 is not limited to machining, and examples thereof include various works such as application of a paint, an adhesive, grease, and the like to a workpiece, welding, photography, inspection, measurement, and assembly.

Various works such as machining may be performed by manually operating the working device 4, and various manual works and various automatic works mainly controlled by the device control unit Cu may be used in combination.

Although the second jig 16 is directly connected to an output shaft of the motor 19 in FIG. 2, the second jig 16 may be connected to the output shaft of the motor 19 via a rotational drive force transmission mechanism such as a belt.

When the force sensors 20 and 20A in FIGS. 2 and 12 are 6-axis force sensors, any type of force sensor other than the strain gauge type force sensor, such as a capacitance force sensor, a piezoelectric force sensor, and an optical force sensor, may be adopted. The force sensors 20 and 20A may be subjected to torque calibration at irregular time intervals, and may be subjected to the torque calibration at regular time intervals.

The working device 4 may be moved instead of the movement of the robots 6, 7 in FIG. 1 or the like. The working device 4 and the robots 6, 7 or the like may be independently moved together.

The robot 6 or the robot 7 can also be operated independently. For example, only the robot 6 may be supported by the conveyance table 12 and conveyed, and only the robot 6 may be fixed to an installation surface such as a floor. Similarly to the above, only the robot 7 may be supported by the conveyance table 12 and conveyed, and only the robot 7 may be fixed to an installation surface such as a floor.

The fastener is not limited to the hexagon socket head bolt 8 in FIG. 13A, and for example, a Torx (registered trademark) screw, a hexagon bolt, a small screw, and the like can be applied.

As the detection sensor 21 in FIG. 2, an ultrasonic sensor or the like other than the laser type distance sensor may be adopted.

In the roller drive system 26 in FIG. 12, only one of the two rotary rollers 28, 28 may be driven to rotate, and the other rotary roller 28 may be driven-rotated by a frictional force with the bolt 8. In this case, the number of gears in the gear train may be reduced and the structure may be simplified as compared with the above embodiment.

The device main body 4A in FIG. 1 may be a working device that is driven to rotate around a horizontal axis.

Figure 16:
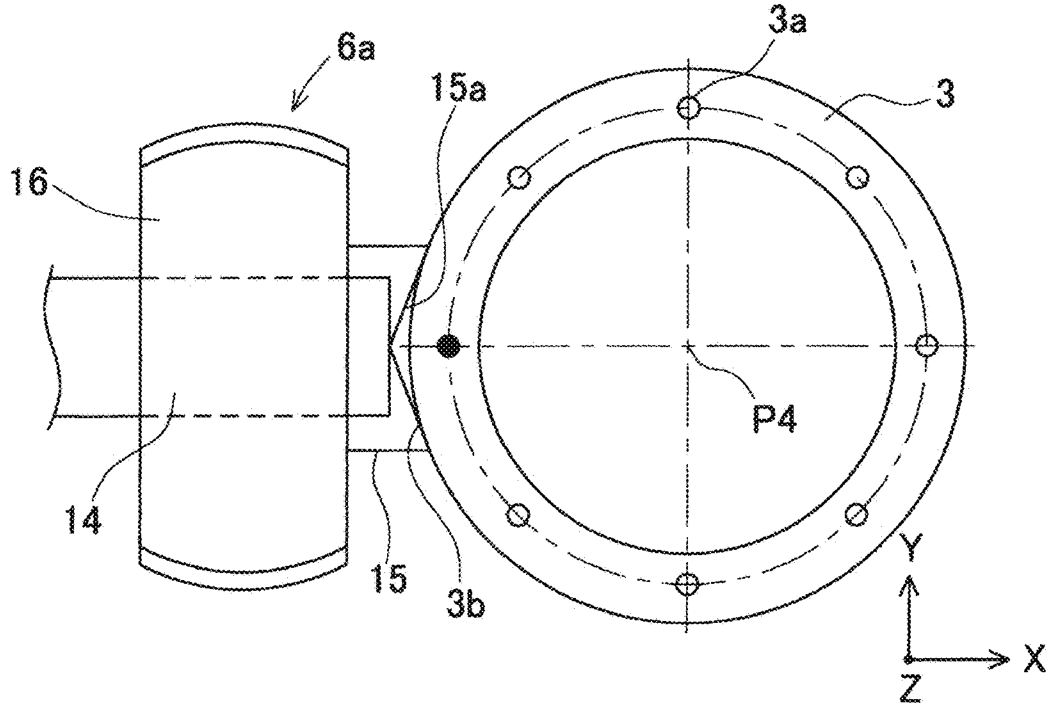
FIG. 16 is a diagram showing a schematic configuration of another modification of the same robot system.

As shown in FIG. 16, the first engaging portion 15*a* of the first jig 15 may have a V shape in a plan view that is engaged with the first engaged portion 3*b* as the outer peripheral portion of the component 3. In this case, the structure of the first jig 15 can be simplified and the cost can be reduced as compared with the embodiment in which the first engaging portion 15*a* is set to have the same curvature as that of the first engaged portion 3*b*.

As a method of detecting the position information in the X, Y, and Z directions and the posture information, the position information in the X, Y, and Z directions and the posture information may be detected at regular time intervals or after the working device 4 and the robots 6, 7 in FIG. 1 approach each other or move away from each other a predetermined number of times.

Depending on an attachment structure of the component 3 to the working device 4, the second engaged portion 10 may be provided on an upper surface of the component 3 in FIG. 7A, and the robot arm 6*c* in FIG. 3 may be moved downward in the Z direction so as to press the second engaging portions 16*a* against the second engaged portion 10.

The component 3 is not limited to the ring-shaped component, and may have, for example, a polygonal shape.

The gear train 32 in FIG. 12 may increase the rotational force of the motor 31.

As described above, the robot 6 according to a first aspect of the present embodiment includes: the robot hand 6*a* attached to the distal end portion of the robot arm 6*c*, and the control unit 2*a* that each controls the operations of the robot arm 6*c* and the robot hand 6*a* to perform a work on the object 3. The robot hand 6*a* includes the force sensor 20, and the control unit 2*a* controls the operation of the robot arm 6*c* such that the force sensor 20 detects the position information and the posture information on the object 3 by pressing a part of the robot hand 6*a* against the object 3. According to this configuration, since the position information and the posture information on the object 3 are detected by the force sensor 20, as compared with the conventional structure including the large-scale moving unit described above, it is possible to reduce the number of components of the robot 6 to simplify the structure, and increase the weight capacity and the movable range. Therefore, the generality of the robot 6 can be improved as compared with the conventional structure. The position information and the posture information on the component 3 attached to the device main body 4A are detected by the force sensor 20 without using a camera or the like. Therefore, even in the case in which the clearance below the component 3 attached to the working device 4 cannot be secured, it is possible to reliably correct the misalignments in the relative positions and the inclination between the working device 4 and the robots 6, 7.

With respect to the robot 6 according to a second aspect of the present embodiment, in the first aspect, the control unit 2*a* may detect the position information on the object 3 in the horizontal direction by horizontally moving the robot arm 6*c* in a direction in which the sensor output of the force sensor 20 decreases in a state in which the first engaging portion 15*a*, which is a part of the robot hand 6*a*, is pressed against the first engaged portion 3*b* provided on one side surface of the object 3. According to this configuration, by pressing a part of the robot hand 6*a* against one side surface of the object 3, the position information on the object 3 in the horizontal direction can be easily and reliably detected. Since the position information on the object 3 can be detected without newly adding a large-scale mechanism or the like, as compared with the conventional structure, it is possible to reduce the number of components to simplify the structure, and reliably increase the weight capacity and the movable range.

With respect to the robot 6 according to a third aspect of the present embodiment, in the second aspect, the control unit 2*a* may detect the position information in the vertical direction and the posture information on the object 3 by vertically moving the robot arm 6*c* in the direction in which the sensor output of the force sensor 20 decreases in a state in which the second engaging portions 16*a*, which are a part of the robot hand 6*a*, are pressed against the second engaged portion 10 provided on the lower surface or the upper surface of the object 3. According to this configuration, by pressing a part of the robot hand 6*a* against the second engaged portion 10 of the object 3, the position information and the posture information on the object 3 can be detected. Therefore, as compared with the conventional structure, it is possible to reduce the number of components to simplify the structure, and reliably increase the weight capacity and the movable range.

The robot system 1 according to a fourth aspect of the present embodiment includes the robot 6 according to any one of the first to third aspects, and the working robot 7 that performs a predetermined work on the object 3. According to this configuration, the work of detecting the position information and the posture information on the object 3 and the work on the object 3 can be performed in cooperation with each other.

An operation method of the robot 6 according to a fifth aspect of the present embodiment includes detecting the position information on an object 3 by pressing a part of the robot hand 6*a* against the object 3 and moving the robot arm 6*c* connected to a base portion of the robot hand 6*a* in the direction in which the sensor output of the force sensor 20 provided in the robot hand 6*a* decreases. According to this configuration, the position information and the posture information on the object 3 are detected by the force sensor 20. Therefore, as compared with the conventional structure including the large-scale moving unit described above, it is possible to reduce the number of components of the robot 6 to simplify the structure, and increase the weight capacity and the movable range. Therefore, the generality of the robot 6 can be improved as compared with the conventional structure.

Although the preferred embodiments of the present invention have been described above with reference to the drawings, various additions, modifications, or deletions may be made without departing from the gist of the present invention. Therefore, such additions, modifications, or deletions are also included in the scope of the present invention.

REFERENCE SIGNS LIST

1 robot system
2 control device
2*a* control unit
3 component (object)
3*b* first engaged portion
6 robot
6*a* robot hand
6*c* robot arm
10 tapered portion (second engaged portion)
15*a* first engaging portion
16*a* second engaging portion
20, 20A force sensor

The invention claimed is:

1. A robot comprising:
a robot hand attached to a distal end portion of a robot arm; and
a control unit configured to control each operation of the robot arm and the robot hand to perform a work on an object, wherein
the robot hand includes a force sensor,
the control unit controls the operation of the robot arm such that the force sensor detects position information and posture information on the object by pressing a part of the robot hand against the object, and
the control unit detects the position information on the object in a horizontal direction by horizontally moving the robot arm in a direction where a sensor output of the force sensor decreases, in a state where a first engaging portion which is a part of the robot hand is pressed against a first engaged portion provided on one side surface of the object.

2. The robot according to claim 1, wherein
the control unit detects the position information in a vertical direction and the posture information on the object by vertically moving the robot arm in the direction where the sensor output of the force sensor decreases, in a state where a second engaging portion which is a part of the robot hand is pressed against a second engaged portion provided on a lower surface or an upper surface of the object.

3. A robot system comprising:
the robot according to claim 1; and
a working robot configured to perform a predetermined work on the object.

4. A robot operation method, comprising:
detecting position information on an object by pressing a part of a robot hand against the object and moving a robot arm connected to a base portion of the robot hand in a direction where a sensor output of a force sensor provided in the robot hand decreases,
wherein the position information on the object is detected in a horizontal direction by horizontally moving the robot arm in a direction where a sensor output of the force sensor decreases, in a state where a first engaging portion which is a part of the robot hand is pressed against a first engaged portion provided on one side surface of the object.

* * * * *